US012687683B2

(12) United States Patent (10) Patent No.: US 12,687,683 B2

Hu et al. (45) Date of Patent: Jul. 21, 2026

(54) LIGHT-COUPLING DEVICE

(71) Applicant: FOCI FIBER OPTIC COMMUNICATIONS, INC., Hsinchu (TW)

(72) Inventors: Ting-Ta Hu, Hsinchu (TW); Po-Yi Wu, Hsinchu (TW); Chieh-Yu Fang, Hsinchu (TW); Ting-Yan Lin, Hsinchu (TW)

(73) Assignee: FOCI FIBER OPTIC COMMUNICATIONS, INC., Hsinchu (TW)

( * ) Notice: Subject to any disclaimer, the term of this patent is extended or adjusted under 35 U.S.C. 154(b) by 173 days.

(21) Appl. No.: 18/207,256

(22) Filed: Jun. 8, 2023

(65) Prior Publication Data

US 2024/0345329 A1 Oct. 17, 2024

(30) Foreign Application Priority Data

Apr. 17, 2023 (TW) .................................. 112114270

(51) Int. Cl.
*G02B 6/42* (2006.01)
*G02B 6/30* (2006.01)
*G02B 6/32* (2006.01)

(52) U.S. Cl.
CPC ............. *G02B 6/4214* (2013.01); *G02B 6/30* (2013.01); *G02B 6/325* (2013.01); *G02B 6/4206* (2013.01)

(58) Field of Classification Search
CPC ...... G02B 6/327; G02B 6/325; G02B 6/3644; G02B 6/4214
See application file for complete search history.

(56) References Cited

U.S. PATENT DOCUMENTS

| | | | | |
|---|---|---|---|---|
| 6,213,650 B1 * | 4/2001 | Moriyama | ........... | G02B 6/4214 |
| | | | | 385/94 |
| 6,370,292 B1 * | 4/2002 | Strake | ...................... | G02B 6/10 |
| | | | | 385/14 |
| 7,316,512 B2 * | 1/2008 | Shih | ......................... | G02B 6/43 |
| | | | | 385/47 |
| 7,534,052 B2 * | 5/2009 | Fujiwara | .............. | G02B 6/4292 |
| | | | | 398/139 |
| 9,122,025 B2 * | 9/2015 | Ishikawa | .............. | G02B 6/4204 |
| 11,668,875 B2 * | 6/2023 | Erickson | ................ | G02B 7/003 |
| | | | | 359/402 |
| 2007/0297729 A1 * | 12/2007 | Kodama | .............. | H05K 1/0274 |
| | | | | 385/94 |
| 2018/0149815 A1 * | 5/2018 | Héroux | .................... | G02B 6/34 |

(Continued)

*Primary Examiner* — Thomas A Hollweg
*Assistant Examiner* — Marc E Manheim

(57) ABSTRACT

A light-coupling device includes an interposer, an optical chip, an optical waveguide element and a fiber array connector. The waveguide element is fixed in a locating slot formed by a top recess on the interposer. The optical chip includes a waveguide layer with a light-emitting surface located aside the optical chip. The optical waveguide element includes an incident surface facing the light-emitting surface, an emergent surface located atop, and a reflective surface located inside. The fiber array connector includes an optical waveguide lens and a plurality of fibers. The optical waveguide lens faces the emergent surface. One of both horizontal sides of the optical waveguide lens is a tilted reflective surface while the other is a light-coupling surface aligned with the fibers.

7 Claims, 6 Drawing Sheets

(56)  References Cited

U.S. PATENT DOCUMENTS

| | | | |
|---|---|---|---|
| 2022/0066103 A1* | 3/2022 | Oyama | G02B 6/383 |
| 2023/0092821 A1* | 3/2023 | Karhade | G02B 6/421 |
| | | | 385/14 |
| 2024/0192453 A1* | 6/2024 | Liu | G02B 6/4214 |
| 2024/0345348 A1* | 10/2024 | Fontaine-Picoureix | |
| | | | G02B 6/421 |

* cited by examiner

LIGHT-COUPLING DEVICE

CROSS-REFERENCE TO RELATED APPLICATION

This application claims the priority of Taiwanese patent application No. 112114270, filed on Apr. 17, 2023, which is incorporated herewith by reference.

BACKGROUND OF THE INVENTION

1. Field of the Invention

The present invention relates generally to a light-coupling device, and more particularly, to a light-coupling device coupling and vertically reflecting a light beam in a waveguide into a fiber.

2. The Prior Arts

A fiber array connector, such as Reflowable Lensed Fiber Array Connector (ReLFACon™) of FOCI Fiber Optic Communications, Inc., may couple a fiber array (FA) to a waveguide of an optical chip. When the light-emitting surface of the waveguide is located at the edge of the optical chip, there may be other various types of elements located on the light-transmission path of the waveguide at the edge of the optical chip, so that the fiber array is unable to be directly coupled in front of the waveguide. Thus, the light beam transmitted within the waveguide requires a coupler and a reflective device to be coupled into the fiber.

A grating coupler changes the transmission direction of a light field with the diffraction effect of the grating to couple a light beam from a fiber to a waveguide. Comparing with an edge coupler, a grating coupler may be disposed at any position on a chip and is more tolerable to fiber misalignment. However, due to the diffraction effect, the coupling efficiency of a grating coupler is generally lower than an edge coupler. A method to improve coupling efficiency is plating a metal reflective layer on the surface of the chip. However, such a method requires the decrease of chip thickness and increases the complexity and cost of the manufacturing process.

As such, a light-coupling device able to be placed at any position on a chip with higher coupling efficiency is desired to be provided to allow a light beam in a waveguide to be coupled and vertically reflected into a fiber.

SUMMARY OF THE INVENTION

A primary objective of the present invention is to provide a light-coupling device able to be placed at any position on a chip with higher coupling efficiency to allow a light beam in a waveguide to be coupled and vertically reflected into a fiber.

For achieving the foregoing objectives, the present invention provides a light-coupling device. The light-coupling device includes an interposer, an optical chip, an optical waveguide element, and a fiber array connector. The optical chip is disposed on top of the interposer, the optical chip having a waveguide layer, a light-emitting surface of the waveguide layer being located at an edge of the optical chip. The optical waveguide element is disposed outside the optical chip on top of the interposer along an exterior side of the optical chip, the optical waveguide element including an incident surface facing the light-emitting surface, an emergent surface located at a top surface of the optical waveguide element, and a reflective surface located inside the optical waveguide element, a light beam emitted horizontally from the light-emitting surface entering the optical waveguide element through the incident surface, being totally reflected through the reflective surface, and being output as a parallel light beam in the vertical direction through the emergent surface. The fiber array connector is disposed on top of the optical chip, the fiber array connector including a carrier, an optical waveguide lens fixed to the carrier, and a plurality of fibers, the optical waveguide lens facing the emergent surface, one of both sides of the optical waveguide lens at the horizontal direction being a tilted reflective surface while the other being a light-coupling surface aligned with the fibers, the light beam being emitted from the emergent surface and entering the optical waveguide lens, being totally reflected through the tilted reflective surface and being coupled to the fibers in the horizontal direction.

According to an embodiment of the present invention, the interposer has a top recess forming a locating slot, and the bottom of the optical waveguide element is fixed in the locating slot.

According to an embodiment of the present invention, the optical waveguide element includes a light-transmitting layer and a light-reflective layer of distinct refractive indices, the incident surface is located at the direction perpendicular to the light-transmitting layer, the emergent surface is located at a top surface of the light-transmitting layer, and the reflective surface forms a junction surface between the light-reflective layer and the light-transmitting layer.

According to an embodiment of the present invention, the reflective surface is a tilted plane mirror surface, the emergent surface is a convex lens, the light beam at the horizontal direction being totally reflected through the reflective layer, converged with the convex lens, and output as a parallel light beam through the emergent surface.

According to an embodiment of the present invention, the light-reflective layer and the light-transmitting layer are fabricated with distinct materials to allow the light beam to be reflected through the reflective layer.

According to an embodiment of the present invention, the reflective surface is a concave mirror surface, and the emergent surface is a plane, to allow the light beam at the horizontal direction to be totally reflected into a parallel light beam through the reflective layer and output through the emergent surface.

According to an embodiment of the present invention, the light-transmitting layer is fabricated with a light-transparent material.

According to an embodiment of the present invention, at least one locating hole is disposed on the optical chip, at least one locating pole extends from the carrier at a position corresponding to the locating hole, and when the locating pole is adhered in the locating hole, the fiber array connector is fixed on the optical chip.

Accordingly, the present invention is advantageously adapted for providing a light-coupling device with both universality and coupling efficiency which changes the transmission path of a light beam to effectively couple a waveguide and a fiber. Moreover, the present invention uses the locating slot to fix the position of the optical waveguide element and the locating hole to fix the position of the fiber array connector. With such a passive alignment method, the assembly time is reduced while the assembly precision is maintained, and the manufacturing efficiency and product yield rate are significantly increased.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

The accompanying drawings are included to provide a further understanding of the invention and are incorporated in and constitute a part of this specification. The drawings illustrate embodiments of the invention and, together with the description, serve to explain the principles of the invention.

Figure 1:
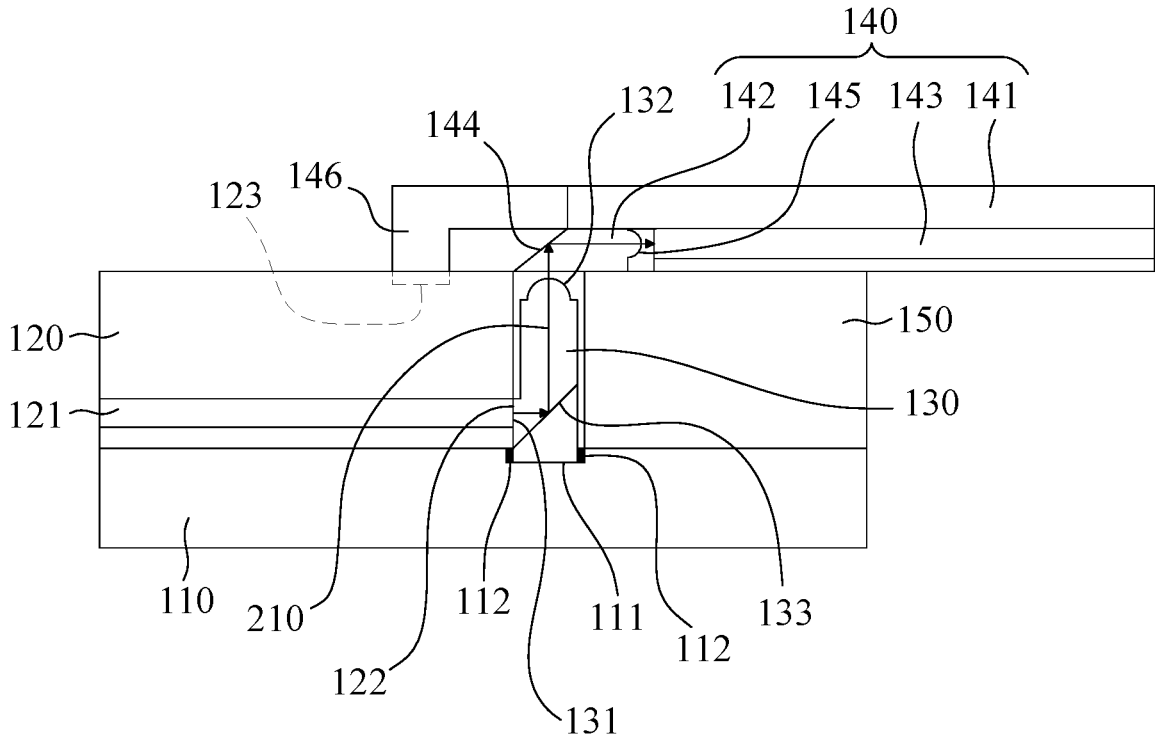
FIG. 1 illustrates an embodiment of the light-coupling device provided by the present invention.

Referring to FIG. 1, which is the light-coupling device of the present invention, includes: an interposer 110, an optical chip 120, an optical waveguide element 130 and a fiber array connector 140. On top of the interposer 110, the optical chip 120 and the optical waveguide element 130 are loaded alongside each other, and the fiber array connector 140 is fixed on top of the optical waveguide element 130. Referring together with FIG. 2, in the present invention, a light beam 210 emitted from the edge of the optical chip 120 is first totally reflected vertically upwards through the optical waveguide element 130, then totally reflected through the fiber array connector 140 and output in a horizontal path, by which to elevate the path of the light beam 210, which is advantageous to the utilization of the area on top of the interposer 110. For example, in the present embodiment, a supporter 150 is added on top of the interposer 110 next to the optical waveguide element 130. Alternatively, other electronic elements on top of the interposer 110 may be placed at different positions more conveniently.

The optical chip 120 is a silicon photonic chip or a photonic integrated circuit (PIC). The optical chip 120 may be fixed on top of the interposer 110 with gluing process or directly formed on top of the interposer 110 with semiconductor manufacturing process. The optical chip 120 has a waveguide layer 121 therein and has a light-emitting surface 122 of the waveguide layer 121 at a side vertical surface of the optical chip 120. In the present embodiment, the thickness of the optical chip 120 is approximately 0.7 mm.

The interposer 110 is a silicon substrate which may allow each component to be precisely fixed thereon and then installed on determined positions or on a circuit board with the interposer 110. When forming the optical chip 120 by semiconductor manufacturing processes, a locating slot 111 may be formed on the interposer 110. The locating slot extends along the direction vertical to the drawing sheet. As shown in FIG. 1, the silicon substrate of the interposer 110 has a top recess forming the locating slot 11, thus the precision of the locating slot 111 and relative location of the optical chip 120 may be more accurate. When assembling, first set the bottom of the optical waveguide element 130 inside the locating slot 111 to achieve a prompt positioning, then perform fine-tuning and calibration, and finally fix the optical waveguide element 130 on top of the interposer 110 with adhesive 112 (such as UV glue), by which to finish the assembly and positioning of the optical chip 120 and the optical waveguide element 130 precisely and promptly. Such a passive alignment method may significantly shorten the assembly time and increase the assembly efficiency and precision.

Figure 2:
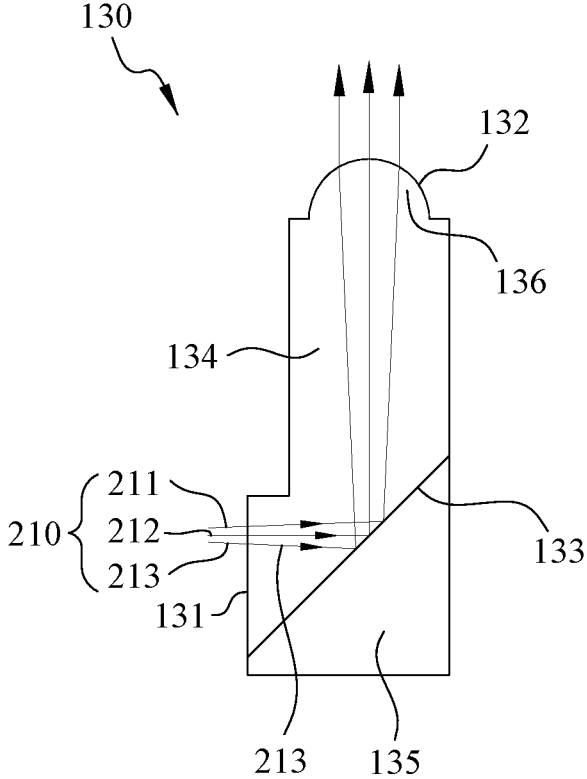
FIG. 2 illustrates an embodiment of the optical waveguide element of the light-coupling device provided by the present invention.

Referring together with FIG. 2, the optical waveguide element 130 includes an incident surface 131 at a vertical surface, an emergent surface 132 at a top surface and a reflective surface 133 inside the optical waveguide element 130. The incident surface 131 faces the light-emitting surface 122 of the waveguide layer 121. When the light beam 210 is emitted from the light-emitting surface 122, the light beam 210 enters the optical waveguide element 130 through the incident surface 131, then is totally reflected by the reflective surface 133 and is output as a parallel light beam through the emergent surface 132 in the vertical direction. To achieve the total reflection effect, the optical waveguide element 130 of the present invention is formed with a light-transmitting layer 134 and a light-reflective layer 135 with distinct refractive indices, the incident surface 131 being located at the direction perpendicular to the light-transmitting layer 134, the emergent surface 132 being located at a top surface of the light-transmitting layer 134, and the reflective surface 133 forming a junction surface between the light-reflective layer 135 and the light-transmitting layer 134. To achieve the total reflection effect of the reflective surface 133, the refractive index of the light-transmitting layer 134 is smaller than the refractive index of the light-reflective layer 135. In the present embodiment, the light-transmitting layer 134 is fabricated by a light-transparent material, such as resin or adhesives. The light-reflective layer may also be fabricated by a light-transparent material with a different refractive index, such as glass or glasslike materials. The light-reflective layer 135 may also be a metal to directly form a mirror surface at the reflective surface 133 to achieve total reflection effect. To make the light beam 210 passing through the optical waveguide element 130 and then be output as a parallel light beam at the emergent surface 132, in the present embodiment, the reflective surface 133 is a mirror surface with a 45-degree tilt, at the location of the emergent surface 132 is a convex lens 136. As shown in FIG. 2, when the light beam 210 is emitted into the optical waveguide element 130 through the incident surface 131, emergent light beams 211, 212 and 213 are transmitted within the light-transmitting layer 134, totally reflected vertically upwards through the reflective surface 133, and converged to a parallel light beam through the convex lens 136 output from the emergent surface 132, wherein the emergent direction of the light beam 210 is perpendicular to the incident direction of the light beam 210.

Figure 3:
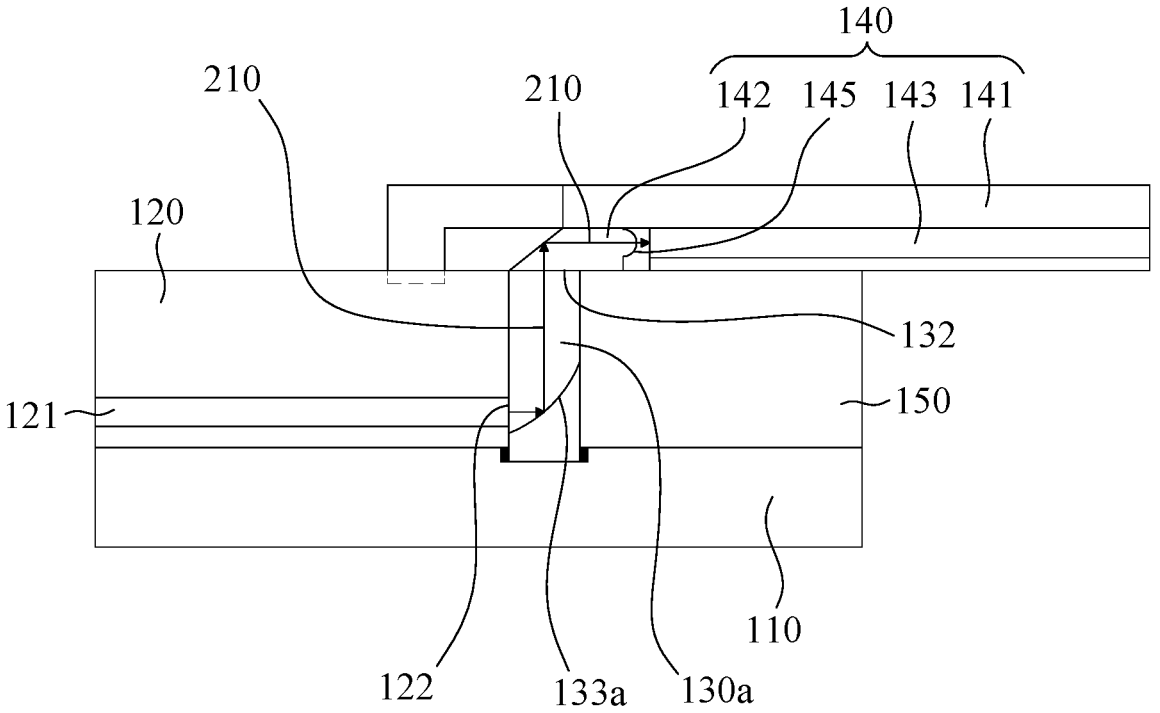
FIG. 3 illustrates another embodiment of the light-coupling device provided by the present invention.
Figure 4:
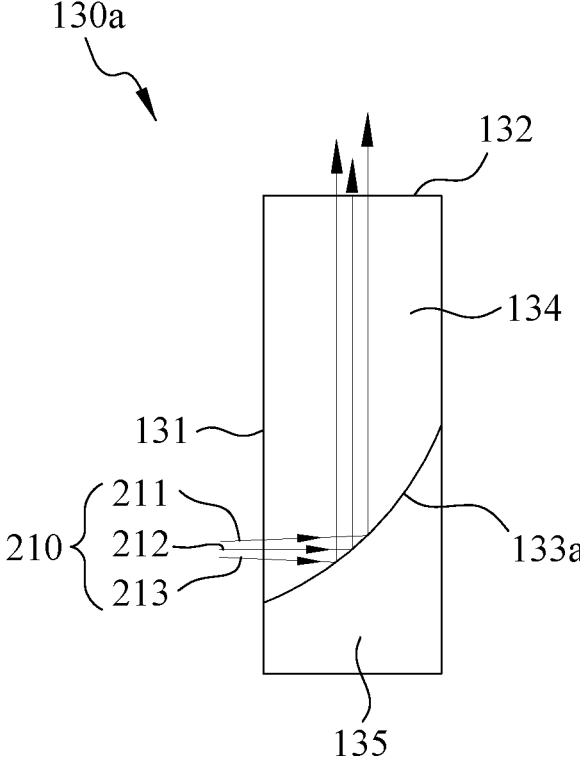
FIG. 4 illustrates another embodiment of the optical waveguide element of the light-coupling device provided by the present invention.

FIGS. 3 and 4 illustrate another embodiment of the present invention, in which the schematic diagram and local enlarged drawing of another optical waveguide element 130*a* are provided. In the present embodiment, the optical waveguide element 130*a* has an incident surface 131, an emergent surface 132 and a reflective surface 133*a* as well, and the optical waveguide element 130*a* is formed with a light-transmitting layer 134 and a light-reflective layer 135 as well. The present embodiment may also allow the light beam 210 to pass through the optical waveguide element

130 and be output as a parallel light beam through the emergent surface 132, and the difference is that in the present embodiment, the reflective surface 133a is a concave mirror surface and the emergent surface 132 is a plane. When the light beam 210 is emitted into the optical waveguide element 130a through the incident surface 131, emergent light beams 211, 212 and 213 are converged to a parallel beam and totally reflected vertically upwards through the reflective surface 133a, transmitted through the light-transmitting layer 134 and output as a parallel light beam through the emergent surface 132. As such, in the present embodiment, a convex lens is not necessary at the emergent surface 132, which is advantageous to manufacturing and machining processes.

Figure 5:
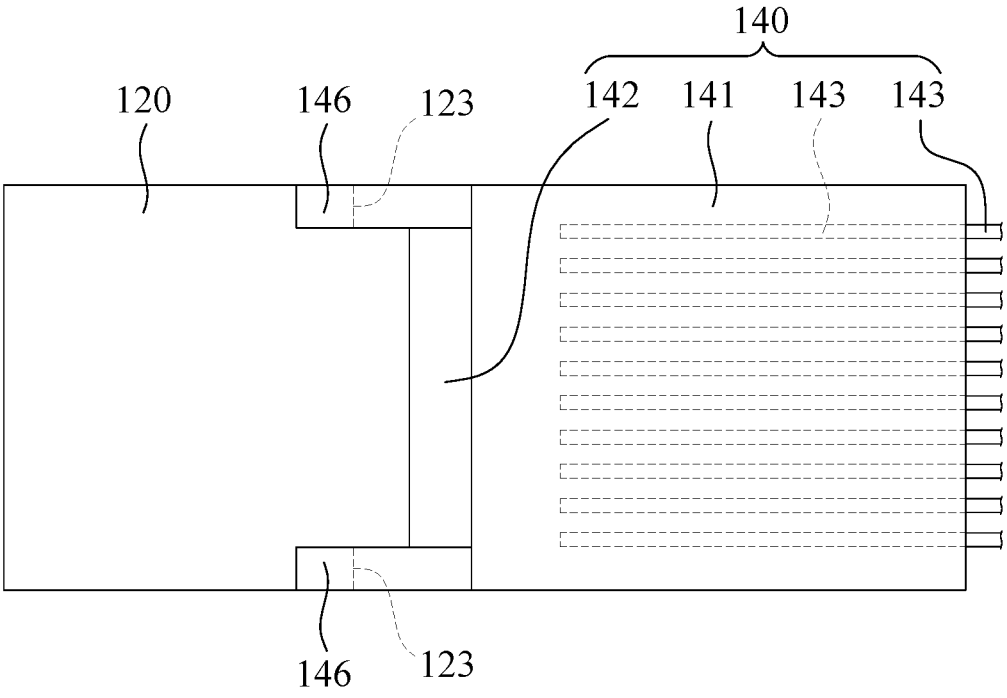
FIG. 5 is the top view of the light-coupling device provided by the present invention.

As shown in FIGS. 1 and 5, a fiber array connector 140 is fixed on top of the optical waveguide element 130 to alter the path of the light beam 210 to horizontal with two total reflections. The fiber array connector 140 includes a carrier 141, an optical waveguide lens 142 fixed on the carrier 141 and a plurality of fibers 143. The optical waveguide lens 142 faces the emergent surface 132. The optical waveguide lens 142 has both sides at the horizontal direction, one of which is a tilted reflective surface 144 and the other is a light-coupling surface 145, the light-coupling surface 145 facing the plurality of fibers 143. In the present embodiment, the angle of the tilted reflective surface 144 is 45 degrees, and the refractive index of the optical waveguide lens 142 is greater than the refractive index of the ambient environment (such as air). As such, the light beam 210 may be output from the emergent surface 132 and enter the optical waveguide lens 142, totally reflected by the tilted reflective surface 144, output at the horizontal direction through the light-coupling surface 145 and coupled to a corresponding fiber 143. Additionally, to make the assembly of the fiber array connector 140 more precise and prompt, a passive alignment method is applied in the present embodiment. From the carrier 141 of the fiber array connector 140, two locating poles 146 extends towards the direction of the optical chip 120. In the present embodiment, the locating poles 146 are L-shaped in the vertical cross-sectional view (as shown in FIG. 1). A plurality of locating holes 123 are disposed on top of the optical chip 120. The locating holes 123 are formed together with the forming of the optical chip 120 with semiconductor manufacturing processes, so the positions may be extremely accurate. In assembly, first plug the locating poles 146 of the fiber array connector 140 into the locating holes 123 and perform initial alignment promptly. Subsequently, after fine-tuning and calibration, perform curing with adhesives such as UV glue. As such, the time consumed in the alignment process between the fiber array connector 140 and the optical waveguide element 130 is significantly shortened, and the product manufacturing becomes more convenient.

In the foregoing embodiments, the optical chip 120 emits the light beam from the edge, and on the light-emitting direction may exist an element 150. In the present invention, with the combination of the optical waveguide element 130 and the fiber array connector 140, the path direction of the light beam may be altered. As shown in FIG. 1, the light beam 210 may first enter the optical waveguide element 130 from left to right at the horizontal direction, then be reflected vertically upwards through the first total reflection, and then be coupled into the fiber 143 from left to right at the horizontal direction through the second total reflection with the optical waveguide lens 142.

Figure 6:
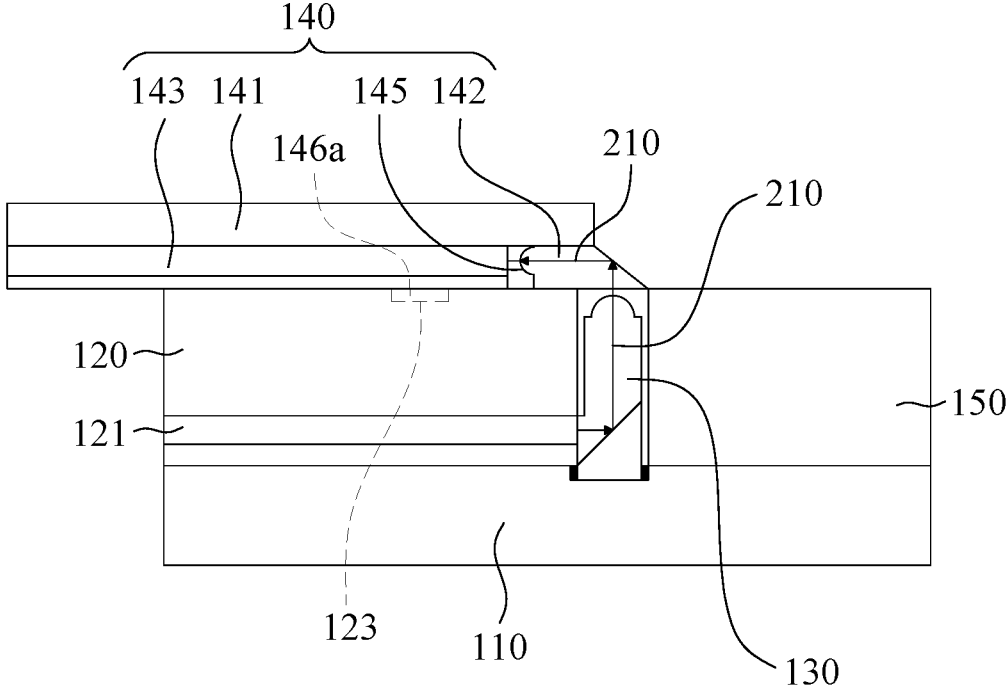
FIG. 6 illustrates yet another embodiment of the light-coupling device provided by the present invention.

As shown in FIG. 6, which is a schematic diagram of another embodiment of the present invention, another light beam transmitting path is provided. In the present embodiment, the fiber array connector 140 is fixed on top of the optical chip 120 to set the optical waveguide lens 142 on top of the optical waveguide element 130. The direction of placement, which is from right to left as shown in the figure, is exactly opposite to that of the embodiment shown in FIG. 1. Also, in the present embodiment, downward-extending locating poles 146a are directly formed on the fiber array connector 140 at both sides of the bottom of the carrier 141. When the locating poles 146a are plugged into the locating holes 123, the fiber array connector 140 is precisely fixed on the optical chip 120. In the present embodiment, the light beam 210 may first enter the optical waveguide element 130 from left to right at the horizontal direction, then be reflected vertically upwards through the first total reflection, and then be coupled into the fiber 143 from right to left at the horizontal direction through the second total reflection with the optical waveguide lens 142.

Comparing with well-known grating couplers, in the present invention, the light-coupling device does not use a grating to perform light-coupling, but uses a plane mirror or concave mirror structure to couple and vertically reflect the light beam 210 from the waveguide layer 121 to the fiber array connector 140, so that the fiber array connector 140 may totally reflect and alter the direction to horizontal of the light beam 210, and further couple the light beam 210 into the fiber 143. Such a structure overcomes the issue of the undesirable coupling efficiency of grating couplers and allows the optical chip 120 and the supporter 150 to be set above the interposer 110, making good use of the plane area above the interposer 110 and increasing the flexibility of circuit layout. In addition, in assembly, the locating slot 111 is applied on the interposer 110 to promptly locate the optical waveguide element 130, and the optical chip 120 is promptly located to the fiber array connector 140 with locating holes 123. Such a passive alignment assembly method may significantly shorten the alignment and calibration time, significantly increase processing efficiency, and is not prone to misalignment, thus increasing the production yield.

Although the present invention has been described with reference to the preferred embodiments thereof, it is apparent to those skilled in the art that a variety of modifications and changes may be made without departing from the scope of the present invention which is intended to be defined by the appended claims.

What is claimed is:

1. A light-coupling device, comprising:
an interposer having a top recess forming a locating slot;
an optical chip disposed on top of the interposer, the optical chip having a waveguide layer, a light-emitting surface of the waveguide layer being located at an edge of the optical chip;
an optical waveguide element having a bottom portion fixed in the locating slot and being disposed outside the optical chip on top of the interposer along an exterior side of the optical chip, the optical waveguide element including an incident surface facing the light-emitting surface, an emergent surface located at a top surface of the optical waveguide element, and a reflective surface located inside the optical waveguide element, a light beam emitted horizontally from the light-emitting surface entering the optical waveguide element through the incident surface, the light beam being totally reflected through the reflective surface and outputting a parallel light beam in a vertical direction through the emergent surface; and a fiber array connector disposed on top of the optical chip, the fiber array connector including a carrier, an optical waveguide lens fixed to the carrier, and a plurality of fibers, the optical waveguide lens facing the emergent surface, one of two sides of the optical waveguide lens at a horizontal direction being a tilted reflective surface while the other being a light-coupling surface aligned with the fibers, the parallel light beam being totally reflected through the tilted reflective surface after entering the optical waveguide lens and coupled to the fibers in the horizontal direction;

wherein the optical waveguide element has two opposite sides, the optical chip including the waveguide layer is disposed on one side of the optical waveguide element having the incident surface, and another element different from the optical chip is disposed next to the optical waveguide on the other side of the optical waveguide element on top of the interposer below the fiber array connector.

2. The light-coupling device according to claim 1, wherein a supporter or an electronic element is disposed in the adjacent area alongside the optical waveguide element on top of the interposer.

3. The light-coupling device according to claim 1, wherein the reflective surface of the optical waveguide element is a tilted plane mirror surface, the emergent surface is a convex lens, and wherein the light beam emitted horizontally from the light-emitting surface is totally reflected by the tilted plane mirror surface, converged through the convex lens, and output as the parallel light beam through the emergent surface.

4. The light-coupling device according to claim 1, wherein the reflective surface of the optical waveguide element is a concave mirror surface, the emergent surface is a plane, the light beam emitted horizontally from the light-emitting surface being totally reflected by the concave mirror surface as the parallel light beam and output through the emergent surface.

5. The light-coupling device according to claim 1, wherein at least one locating hole is disposed on the optical chip, at least one locating pole extends from the carrier at a position corresponding to the at least one locating hole, and when the at least one locating pole is adhered in the at least one locating hole, the fiber array connector is fixed on the optical chip.

6. The light-coupling device according to claim 1, wherein the optical waveguide element includes a light-transmitting layer and a light-reflective layer of distinct refractive indices, the emergent surface is located at a top surface of the light-transmitting layer, and the reflective surface of the optical waveguide element forms a junction surface between the light-reflective layer and the light-transmitting layer.

7. The light-coupling device according to claim 6, wherein the light-reflective layer and the light-transmitting layer are fabricated with distinct materials to allow the light beam emitted horizontally from the light-emitting surface to be reflected through the light-reflective layer.

* * * * *